(12) United States Patent
Gaskin et al.

(10) Patent No.: US 6,200,075 B1
(45) Date of Patent: Mar. 13, 2001

(54) DRILL MOTOR VACUUM ATTACHMENT

(75) Inventors: Christopher S. Gaskin, Tacoma; Stuart E. Holm, Lake Bay; George W. Lorsbach, III, Tacoma, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/573,433

(22) Filed: May 16, 2000

(51) Int. Cl.[7] .............................. B23B 45/14; B23B 47/34
(52) U.S. Cl. ................... 408/67; 408/95; 408/103
(58) Field of Search .................. 408/51, 53, 79, 408/67, 97, 95, 98, 103

(56) References Cited

U.S. PATENT DOCUMENTS

| | | | |
|---|---|---|---|
| 2,909,049 | * 10/1959 | Winslow | 408/95 |
| 2,935,905 | * 5/1960 | Winslow | 408/95 |
| 4,205,728 | 6/1980 | Gloor et al. . | |
| 5,395,187 | * 3/1995 | Slesinski et al. | 408/67 |
| 5,482,411 | * 1/1996 | McGlasson | 408/67 |
| 5,584,618 | * 12/1996 | Blankenship et al. | 408/67 |
| 5,988,954 | 11/1999 | Gaskin et al. . | |

* cited by examiner

*Primary Examiner*—Daniel W. Howell
(74) *Attorney, Agent, or Firm*—Harness Dickey & Pierce P.L.C.

(57) ABSTRACT

A vacuum attachment device for a nutplate drill motor having a footpiece and at least one cutting tool. The vacuum attachment device comprises a body portion and a nozzle portion. The body portion has a central aperture which engages the footpiece and an air chamber which extends through the body portion and intersects the central aperture to form a vacuum path. The nozzle portion is coupled to the body portion and is in fluid connection with the air chamber. The nozzle portion is coupled to a source of vacuum pressure. During the operation of the nutplate drill motor, dust and chips that are generated by the cutting tool are drawn by the source of vacuum pressure into the air chamber and through the nozzle portion.

20 Claims, 3 Drawing Sheets

DRILL MOTOR VACUUM ATTACHMENT

TECHNICAL FIELD

The present invention relates generally to vacuum attachments for use with power tools and more particularly to a vacuum attachment for use with a drill motor which is readily removable.

BACKGROUND OF THE INVENTION

BACKGROUND ART

The fabrication and assembly of many different types of panels, including aluminum, titanium, graphite carbon fiber and fiberglass fiber panels, throughout various production processes requires drilling. Currently, undesirable dust particles and chips are produced in an uncontrolled manner when drilling operations are performed. Left unchecked, the production of dust particles and chips may potentially pose several risks to both the quality of the product being produced and the health of the technician. The afore-described concerns result from spread of the typically small dust particles and chips to the surrounding area. The risk is especially critical when the panel being drilled is a metallic panel and electrical components are placed in the surrounding area. The health of the technician may be an issue where dust or chips from carbon graphite or fiberglass fiber panels collects on the technician's skin or is inhaled by the technician.

Accordingly, manufacturers and technicians have come to realize the need and benefit of vacuum attachment devices for drill motors. However, because of the added production time involved with mounting and unmounting current vacuum attachment devices to drill motors, many technicians are tempted to abstain from using vacuum attachment devices, even though they desire the protection such devices provide. The disadvantages of current vacuum attachments force technicians to choose between maintaining proper workplace environment standards, and sacrificing valuable production time.

Prior vacuum attachment devices have also met with limited success due to a variety of additional factors, including cost, functionality, weight, material strength, and material durability. One of these prior vacuum attachments includes a body or attachment foot which is clamped to the housing of the drill motor. As the attachment foot is relatively large and formed from steel, it greatly upsets the balance of the tool, rendering tools equipped with the attachment ergonomically uncomfortable. Furthermore, as the geometry of the attachment foot is rather complex to machine, the cost of the attachment is relatively high. As large manufacturing plants may have hundreds of drill motors on hand, the relatively high cost of these attachments presents a critical issue to manufacturers desiring to implement a vacuum device for removing dust and chips.

Another drawback of the known vacuum attachment devices concerns the propensity of chips to become impacted in these devices. Accumulation of chips in these devices impairs the ability with which dust and chips are removed from the work environment. Furthermore, if the cutting tool is permitted to contact the mass of impacted chips, heat generated from friction will be generated which tends to shorten the life of the cutting tool. To alleviate chip impaction, technicians employing the vacuum attachment device must service the device on a frequent basis to remove dust and chips in an attempt to prevent chip impaction. This process can be tedious and time consuming, depending on the design of the attachment and the flow path through which dust and chips are removed. Consequently, there is a continuing need in the art for a functional and cost effective vacuum attachment device that can quickly and easily mount onto a drill motor.

SUMMARY OF THE INVENTION

It is one object of the present invention to provide an effective vacuum attachment device for drill motors which permits chips and dust to be drawn out of the workplace environment by a vacuum source.

It is another object of the present invention to provide a relatively low-cost effective vacuum attachment device for the removal of chips and dust that are generated by a drilling operation.

It is yet another object of the present invention to provide a vacuum attachment device that may be easily attached to a drill motor via a snap-fit aperture.

It is a further object of the present invention to provide a vacuum attachment device having a highly durable construction.

It is yet another object of the present invention to provide a vacuum attachment device having an air chamber which prevents the accumulation of chips and debris in the vacuum attachment device.

In one preferred form, the present invention provides a vacuum attachment device for a nutplate drill motor having a footpiece and at least one cutting tool. The vacuum attachment device comprises a body portion and a nozzle portion. The body portion has a central aperture which engages the footpiece and an air chamber which extends through the body portion and intersects the central aperture to form a vacuum path. The nozzle portion is coupled to the body portion and is in fluid connection with the air chamber. The nozzle portion is coupled to a source of vacuum pressure. During the operation of the nutplate drill motor, dust and chips that are generated by the cutting tool are drawn by the source of vacuum pressure into the air chamber and through the nozzle portion.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
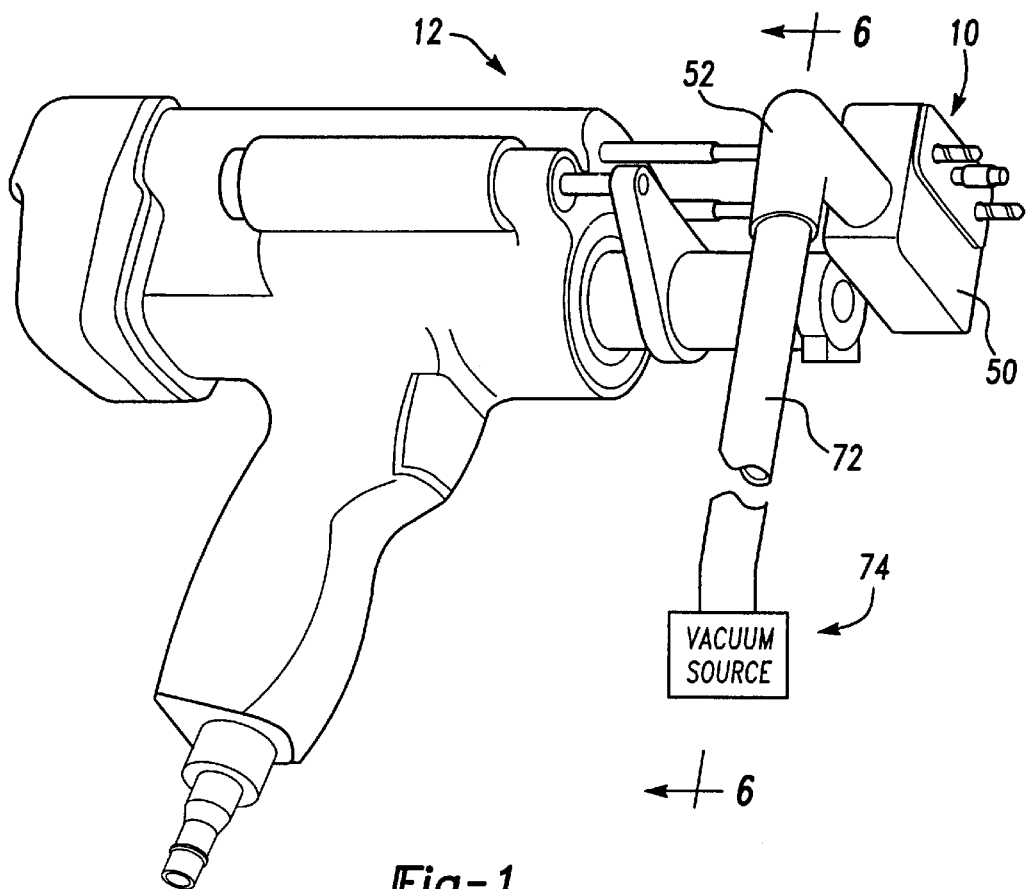
FIG. 1 is a perspective view of a vacuum attachment device constructed according to a preferred embodiment of the present invention in operative association with a nutplate drill motor.

With reference to FIG. 1 of the drawings, a vacuum attachment device constructed in accordance with a preferred embodiment of the present invention is generally indicated by reference numeral 10. Vacuum attachment device 10 is shown in operative association with a conventional nutplate drill motor 12. Nutplate drill motor 12 is also known in the art as a Winslow motor.

Figure 2:
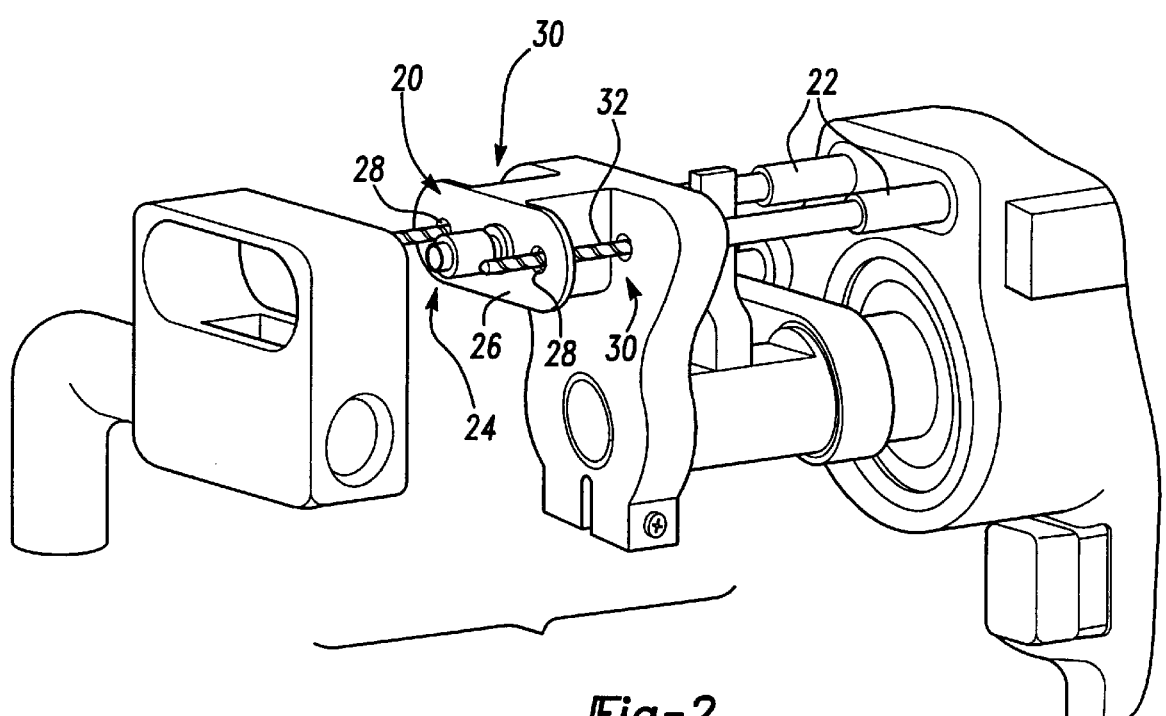
FIG. 2 is a perspective view of the vacuum attachment device of FIG. 1 exploded from the nutplate drill motor.
Figure 3:
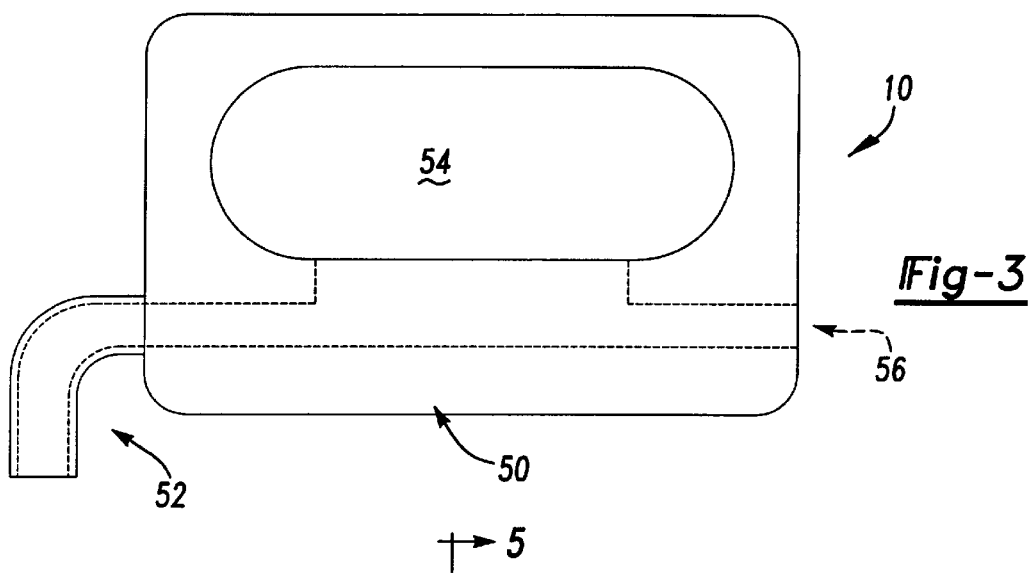
FIG. 3 is a front elevational view of the vacuum attachment device of FIG. 1.
Figure 4:
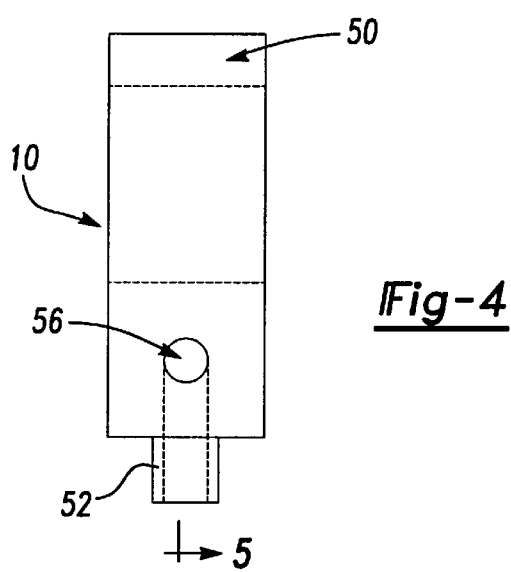
FIG. 4 is a side elevational view of the vacuum attachment device of FIG. 1.
Figure 5:
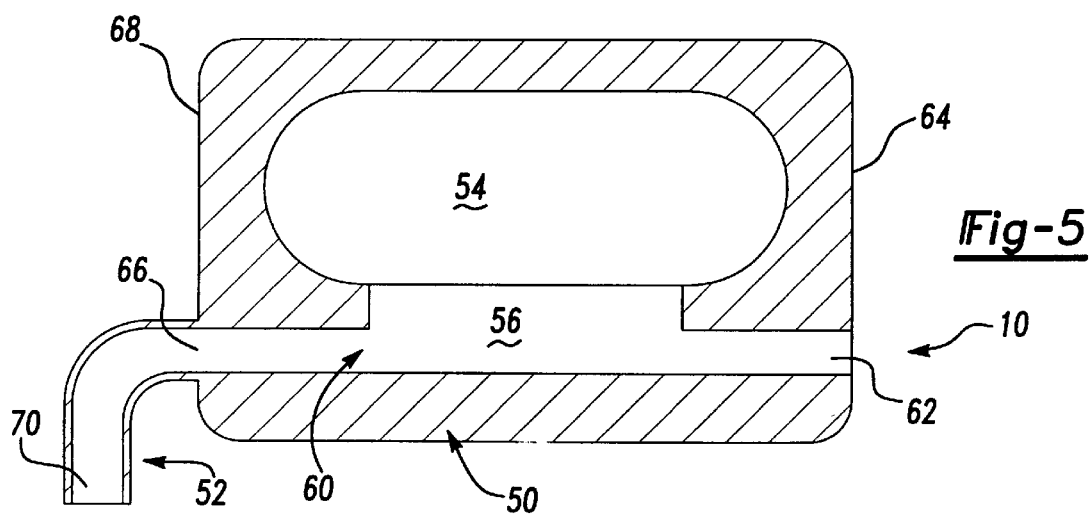
FIG. 5 is a cross-sectional view of the vacuum attachment device taken along the line 5—5 of FIG. 4.

With additional reference to FIG. 2, nutplate drill motor 12 is shown to include a footpiece 20 and a pair of rotatable spindles 22. Footpiece 20 is shown to be generally oval in shape, having a guide member 24 extending from its front face 26. Guide member 24 is situated between two tool bores 28, the axes of which are coincident with the two spindles 22. A U-shaped chip aperture 30 is formed on each lateral side of the footpiece 20. Each chip aperture 30 extends through an associated one of the tool bores 28. A cutting tool 32, such as a drill, is rotatably coupled to each of the spindles 22. Each of the cutting tools 32 are disposed in their respective tool bore 28 and extend past the front face 26 of the footpiece 20 by a predetermined distance that is set by the technician operating the nutplate drill motor 12.

In FIGS. 2 through 5, vacuum attachment device 10 is shown to include a body portion 50 and a nozzle portion 52. Body portion 50 is formed from a resilient material such as urethane and includes a central aperture 54 and an air chamber 56. Central aperture 54 extends through body portion 50 and is sized to sealingly engage the sides of footpiece 20. Air chamber 56 extends through body portion 50 and intersects central aperture 54 to form a vacuum path 60. A first end 62 of air chamber 56 terminates at a first lateral side 64 of body portion 50 and a second end 66 of air chamber 56 is coupled to nozzle portion 52. In the particular embodiment illustrated, air chamber 56 has an inside diameter of about 0.5 inch.

Nozzle portion 52 is fixedly coupled to a second lateral side 68 of body portion 50, extending generally perpendicular therefrom generally coincident with the axis of air chamber 56. Nozzle portion 52 terminates at a vacuum source attachment portion 70 which is shown to extend in a direction perpendicular to the axis of air chamber 56. Nozzle portion 52 preferably comprises a configuration and material composition that slightly expands to create a seal between the nozzle portion 52 and a hose 72 of the vacuum source 74 (FIG. 1).

In the particular embodiment illustrated, body portion 50 and nozzle portion 52 are unitarily formed in a molding operation from a plastic resin such as urethane. One particularly suitable resin material includes 40 parts per volume of H. B. Fuller 3119 Part A Hardener and 100 parts per volume of H. B. Fuller 3125 Part B Resin. The mixture is introduced to a mold at about 35 and produces a vacuum attachment having a hardness of about 65D to about 80D on the elastomer hardness Shore scale, and more preferably having a hardness of about 70D to about 75D on the elastomer hardness Shore scale. Construction in this manner is highly advantageous as it permits body portion 50 to be snap-fit in sealing engagement with footpiece 20, hose 72 to be sealingly engaged to vacuum source attachment portion 70, as well as provides resiliency and robustness to minimize concerns that vacuum attachment device 10 will be damaged during the operation of the nutplate drill motor 12.

Figure 6:
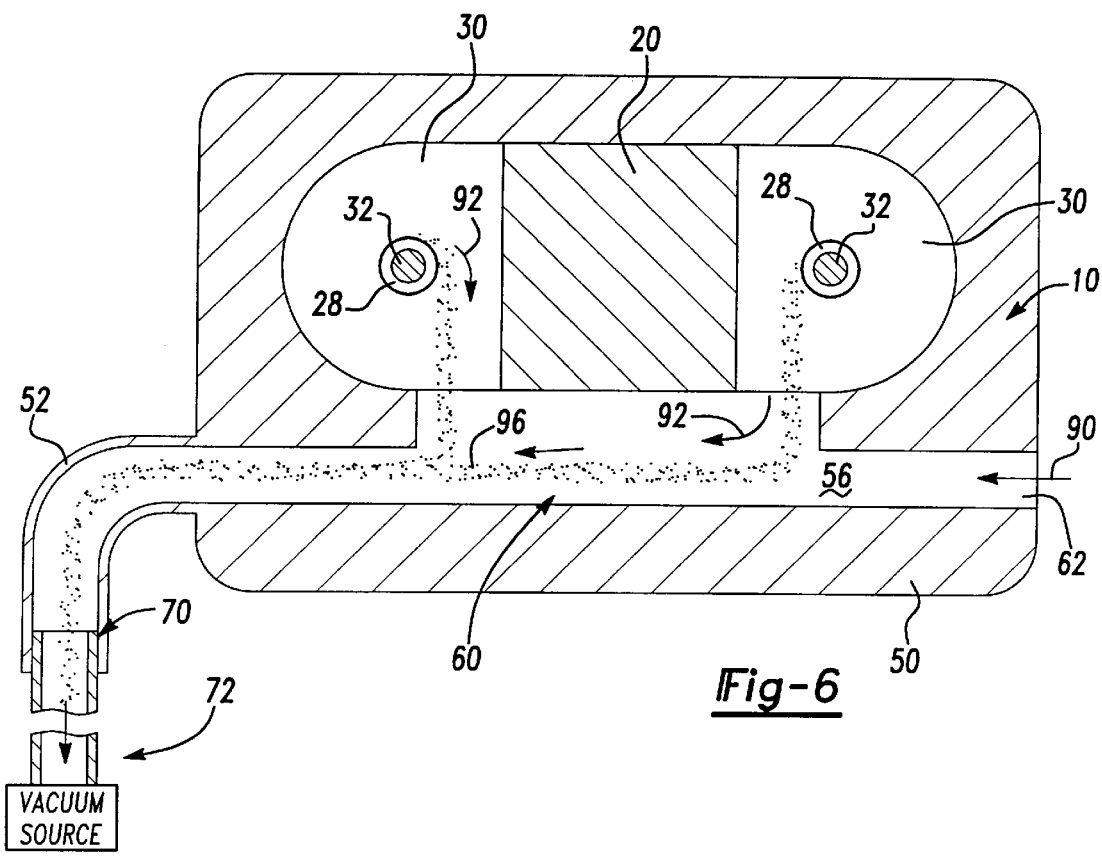
FIG. 6 is a cross-sectional view taken along the line 6—6 of FIG. 1 illustrating the removal of chips and dust when the nutplate drill motor is operated.

Prior to the operation of nutplate drill motor 12, vacuum attachment device 10 is inserted over footpiece 20 where it sealingly engages the perimeter of footpiece 20 as shown in FIG. 6. Hose 72 is inserted to vacuum source attachment portion 70 to provide a fluid communication between the vacuum source 74 and the vacuum attachment device 10. Vacuum source 74 provides vacuum pressure to nozzle portion 52, causing air to be drawing into air chamber 56 from the first end 62 as indicated by arrow 90 and from central aperture 54 as indicated by arrows 92.

During the use of nutplate drill motor 12, dust and chips 96 are generated through the cutting action of the cutting tools 32. Vacuum pressure draws air from central aperture 54 into air chamber 56 and as such, dust and chips 96 are blown through tool bores 28 into chip aperture 30, around central aperture 54 and received into air chamber 56. Air blowing in from the first end 62 of air chamber 56 causes dust and chips 96 in air chamber 56 to be expelled through nozzle portion 52 where they are received by the vacuum source 74. Air flowing into air chamber 56 from its first end prevents dust and chips 96 from collecting in air chamber 56.

Figure 7:
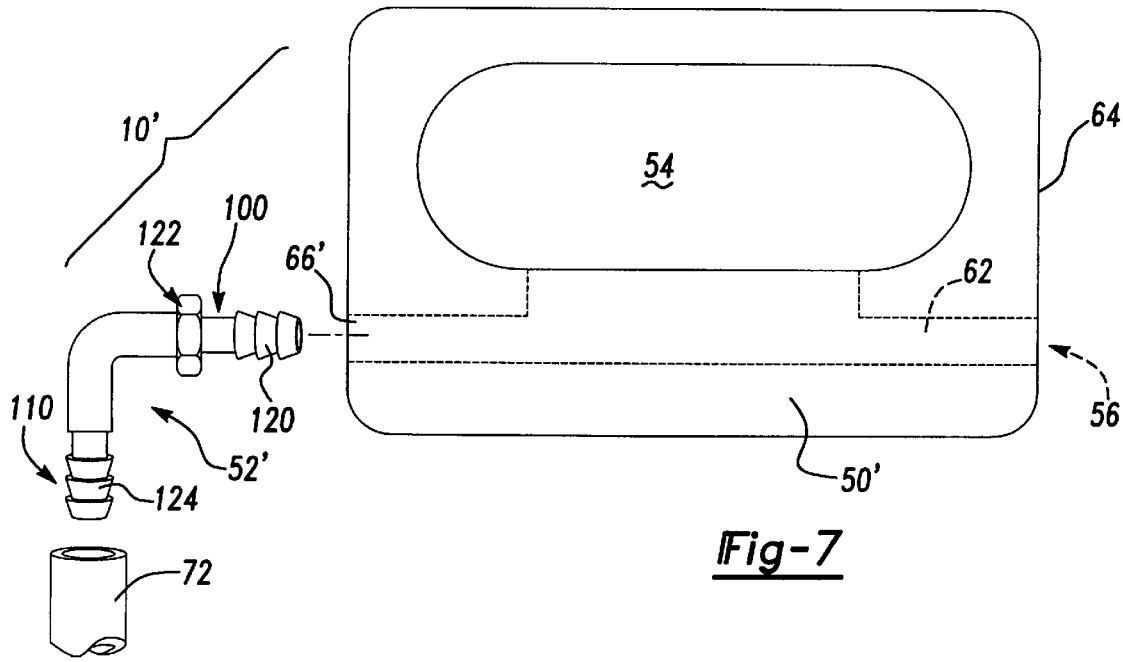
FIG. 7 is an exploded perspective view of a vacuum attachment device constructed in accordance with an alternate embodiment of the present invention.

While the vacuum attachment device 10 has been described thus far with reference to a preferred embodiment, those skilled in the art will appreciate that the invention, in its broader aspects, may be constructed somewhat differently. For example, the nozzle portion 52' and the body portion 50' may be separately formed as shown in FIG. 7. In this arrangement, body portion 50' is substantially similar to body portion 50 and as such, will not be discussed in detail. Nozzle portion 52' includes a first member 100 for engaging body portion 50 and a second member 110 for engaging hose 72. First member 100 is formed from a metal or plastic material to include a plurality of hose barbs 120 which permit first member 100 to be inserted to the second end 66' of air chamber 56' to fixedly couple nozzle portion 52' to body portion 50'. First member 100 is coupled to second member 110 at a swivel joint 122 which permits second member 110 to pivot about the axis of first member 100. Like first member 100, second member 110 is formed from a metal or plastic material and includes a plurality of hose barbs 124. Hose barbs 124 permit second member 110 to be inserted to the hose 72 to fixedly couple second member 110 to vacuum source 74. Construction in this manner is advantageous in that it permits hose 72 to flex when the nutplate drill motor 12 is operated, thereby improving the ergonomics of the drilling operation.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vacuum attachment device for a nutplate drill motor having a footpiece and at least one cutting tool, the vacuum attachment device comprising:

a body portion having a central aperture and an air chamber, the central aperture adapted to engage the footpiece, the air chamber extending through the body portion and intersecting the central aperture to form a vacuum path; and a nozzle portion coupled to the body portion, the nozzle portion being in fluid connection with the air chamber, the nozzle portion adapted to be coupled to a source of vacuum pressure;

wherein dust generated from the at least one cutting tool while the nutplate drill motor is being operated is drawn by the source of vacuum pressure into the air chamber and through the nozzle portion.

2. The vacuum attachment device of claim 1, wherein the vacuum attachment device is unitarily formed.

3. The vacuum attachment device of claim 2, wherein the vacuum attachment device is formed in a molding operation from a plastic resin.

4. The vacuum attachment device of claim 3, wherein the plastic resin is urethane.

5. The vacuum attachment device of claim 1, wherein the central aperture is sized to permit the body portion to be snap-fit to the footpiece of the nutplate drill motor.

6. The vacuum attachment device of claim 5, wherein the body portion is formed from a plastic resin having a hardness of about 65D to about 80D on the elastomer hardness Shore scale.

7. The vacuum attachment device of claim 6, wherein the plastic resin has a hardness of about 70D to about 75D on the elastomer hardness Shore scale.

8. The vacuum attachment device of claim 5, wherein the central aperture is generally oval shaped.

9. The vacuum attachment device of claim 1, wherein the body portion comprises a configuration and material composition that slightly expands to create a seal between the body portion and the footpiece.

10. The vacuum attachment device of claim 1, wherein the nozzle portion comprises a configuration and material composition that slightly expands to create a seal between the nozzle portion and the vacuum source.

11. The vacuum attachment device of claim 1, wherein the nozzle portion and the body portion are formed as separate pieces and secured together.

12. The vacuum attachment device of claim 1, wherein the body portion is generally rectangular in shape.

13. A drill motor comprising:
   a rotatable spindle;
   a footpiece spaced axially apart from the spindle, the footpiece having a tool bore and chip aperture, the chip aperture intersecting the tool bore;
   a cutting tool rotatably coupled to the spindle, the cutting tool extending through the tool bore in the footpiece; and
   a vacuum attachment device coupled to the footpiece, the vacuum attachment device including a body portion and a nozzle portion, the body portion having a central aperture and an air chamber, the central aperture engaging the footpiece, the air chamber extending through the body portion and intersecting the central aperture to form a vacuum path, the air chamber generally aligned to the chip aperture; and
   a nozzle portion coupled to the body portion, the nozzle portion being in fluid connection with the air chamber, the nozzle portion adapted to be coupled to a source of vacuum pressure;
   wherein dust generated from the cutting tool when the drill motor is being operated is drawn by the source of vacuum pressure into the air chamber and through the nozzle portion.

14. The drill motor of claim 13, wherein the body portion of the vacuum attachment device is formed in a molding operation from a plastic resin.

15. The drill motor of claim 14, wherein the plastic resin is urethane.

16. The drill motor of claim 13, wherein the central aperture is sized to permit the body portion to be snap-fit to the footpiece of the drill motor.

17. The drill motor of claim 16, wherein the body portion is formed from a plastic resin having a hardness of about 65D to about 80D on the elastomer hardness Shore scale.

18. The drill motor of claim 17, wherein the plastic resin has a hardness of about 70D to about 75D on the elastomer hardness Shore scale.

19. The drill motor of claim 13, wherein the central aperture is generally oval shaped.

20. The drill motor of claim 13, wherein the body portion comprises a configuration and material composition that slightly expands to create a seal between the body portion and the footpiece.

* * * * *